United States Patent [19]
Kalokhe

[11] 4,439,074
[45] Mar. 27, 1984

[54] BORING TOOL WITH COARSE AND FINE ADJUSTMENT

[75] Inventor: Shivdas A. Kalokhe, Clinton, Canada

[73] Assignee: Ex-Cell-O Corporation, Troy, Mich.

[21] Appl. No.: 393,915

[22] Filed: Jun. 30, 1982

[51] Int. Cl.³ .......................................... B23B 39/00
[52] U.S. Cl. .................................. 408/178; 408/150; 408/153; 408/173; 408/180
[58] Field of Search ............... 408/150, 153, 154, 156, 408/178, 181, 161, 163, 165, 169, 170, 714, 147, 148, 158, 159, 166, 173

[56] References Cited

U.S. PATENT DOCUMENTS

| | | | |
|---|---|---|---|
| 817,042 | 4/1906 | Burns | 408/178 |
| 909,749 | 1/1909 | Brown et al. | 408/168 |
| 992,903 | 5/1911 | Richmond | 408/74 |
| 2,182,770 | 12/1939 | Woodcock | 408/150 |
| 3,391,585 | 7/1968 | Griswold et al. | 408/158 |
| 3,433,104 | 3/1969 | Milewski et al. | 408/226 |
| 3,486,401 | 12/1969 | Kelm | 408/181 |
| 3,625,625 | 12/1971 | Roojen et al. | 408/118 |
| 3,635,572 | 1/1972 | Robinson | 408/181 |
| 3,704,958 | 12/1972 | Gulibon et al. | 408/181 X |
| 3,738,767 | 6/1973 | Benjamin et al. | 408/161 |
| 3,744,924 | 7/1973 | Levosinski et al. | 408/156 |
| 3,749,508 | 7/1973 | Schukrafft | 408/156 |
| 3,853,422 | 12/1974 | Benjamin et al. | 408/161 |
| 3,918,826 | 11/1975 | Friedline | 408/180 X |
| 4,162,867 | 7/1979 | Calcaterra et al. | 408/157 |
| 4,260,303 | 4/1981 | Newman | 408/168 |
| 4,343,576 | 8/1982 | Lagerholm et al. | 408/173 X |

*Primary Examiner*—William R. Briggs
*Assistant Examiner*—Lawrence Meier
*Attorney, Agent, or Firm*—Edward J. Timmer

[57] ABSTRACT

A boring tool includes a central shaft which carries a tool head on a shaft working end and which is mounted in a rotatable bushing for eccentric movement in the tool body. For work adjustment up to 1.00 inch on diameter, the tool head is radially slidable on the working end of the central shaft by an adjustment screw arrangement while the shaft is held by the bushing. For micro-adjustment, the bushing is rotated to move the shaft working end in an eccentric path with a key on the tool body translating this movement into radial microadjustment of the tool head to 0.0001 inch.

12 Claims, 4 Drawing Figures

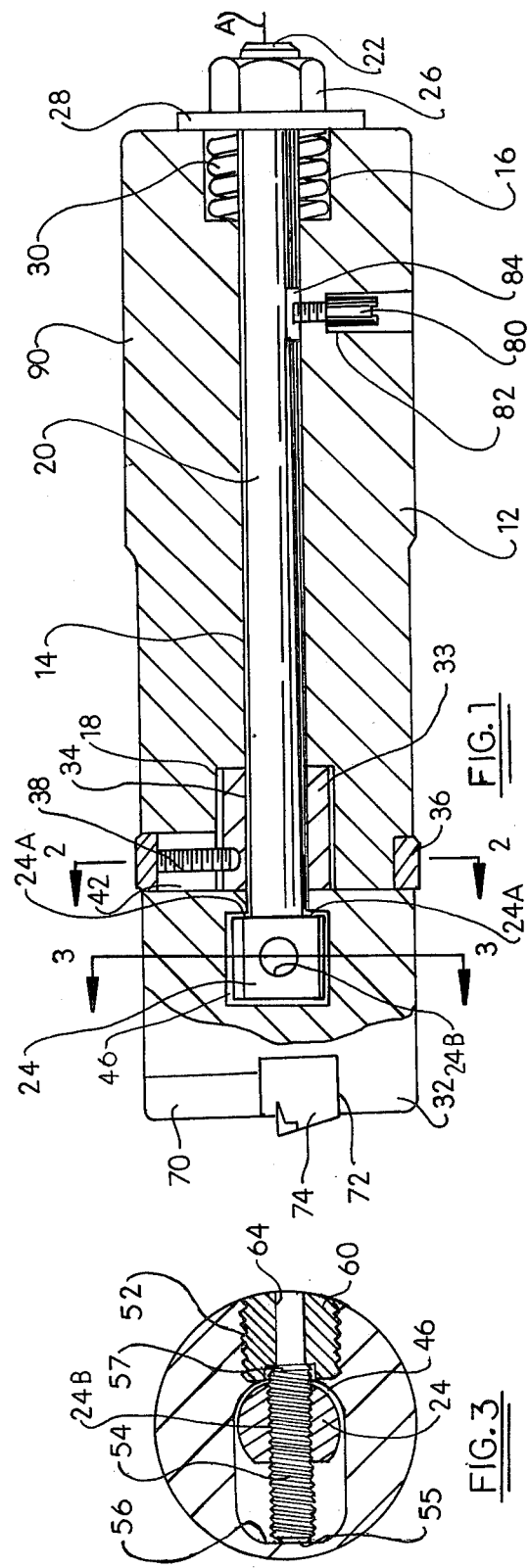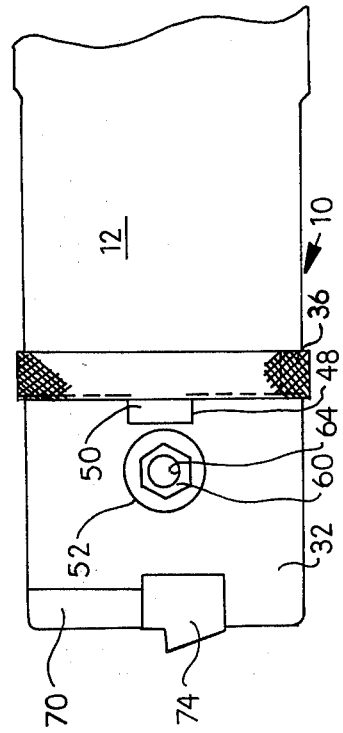

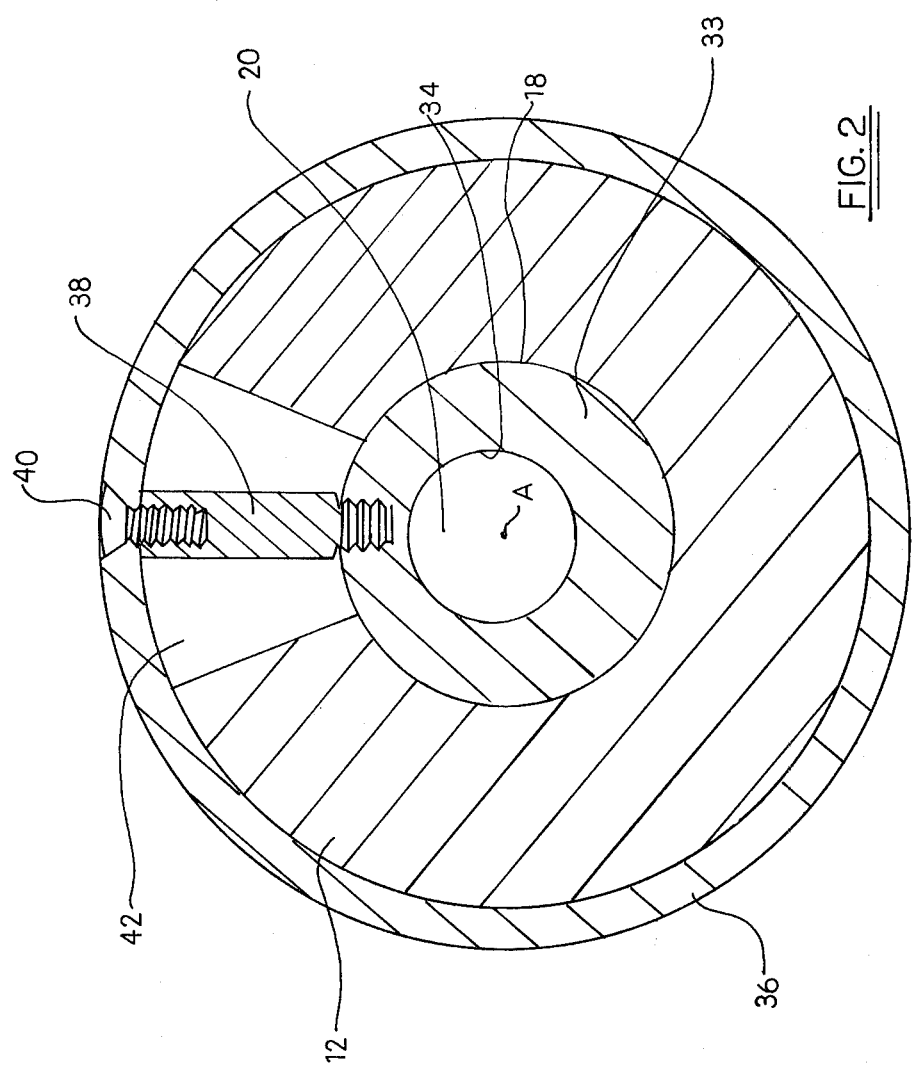

BORING TOOL WITH COARSE AND FINE ADJUSTMENT

FIELD OF THE INVENTION

The present invention relates to a boring tool and, in particular, to a boring tool having coarse and fine cutting diameter adjustment features.

BACKGROUND OF THE INVENTION

Prior art workers have provided various adjustment mechanisms for varying the cutting diameter of a boring tool and these are illustrated in following listed patents:
U.S. Pat. No. 3,391,585 issued July 9, 1968;
U.S. Pat. No. 3,433,104 issued Mar. 18, 1969;
U.S. Pat. No. 3,625,625 issued Dec. 7, 1971;
U.S. Pat. No. 3,738,767 issued June 12, 1973;
U.S. Pat. No. 3,744,924 issued July 10, 1973;
U.S. Pat. No. 3,749,508 issued July 31, 1973;
U.S. Pat. No. 3,853,422 issued Dec. 10, 1974;
U.S. Pat. No. 3,918,826 issued Nov. 11, 1975;
U.S. Pat. No. 4,162,867 issued July 31, 1979;
U.S. Pat. No. 4,260,303 issued Apr. 7, 1981.

An adjustable collapsing tap and an adjustable threading die are described in U.S. Pat. No. 909,749 issued Jan. 12, 1909 and U.S. Pat. No. 992,903 issued May 23, 1911.

SUMMARY OF THE INVENTION

An object of the present invention is to provide a boring tool having a coarse radial adjustment of the tool element.

Another object of the present invention is to provide a boring tool having a wide range of coarse adjustment, for example adjustable through one inch on diameter.

Another object of the present invention is to provide a boring tool having a radial micro-adjustment of the tool element, for example to 0.0001 inch.

Still another object of the invention is to provide a boring tool with coarse and micro radial adjustment mechanisms which are simple in construction and low in cost and yet provide highly accurate positioning of the tool element.

Still a further object of the invention is to provide a boring tool with the above adjustment capabilities and low cost construction which is adapted for use with rotary boring machine spindles commonly used today.

The above capabilities, features and advantages are achieved in a typical working embodiment of the invention by a boring tool having a central shaft means with a working end that carries a tool means. The shaft means is mounted in the tool body such that the shaft means is static relative to the tool body during coarse adjustment of the tool head and is radially floating relative to the tool body during micro adjustment. To this end, a manually rotatable bushing means is mounted in the tool body and includes a bore offset relative to the rotational axis of the tool body. The central shaft means is fitted in the bushing bore such that rotation of the bushing means causes the shaft working end to move through an eccentric path and micro-adjust the radial position of the tool means by means of a key means between the tool body and tool means causing the latter to move radially in response to eccentric movement of the shaft working end.

The tool means preferably includes a tool head which is slidably mounted on the shaft working end for radial movement and is caused to move for coarse adjustment by adjustment screw means which is received in a threaded bore through the shaft end and which reacts against the tool head upon rotation. During coarse adjustment, the shaft is fixed by the bushing means and rotation of the screw means will cause the tool head to move radially relative to the shaft end and tool body. By this mechanism, coarse radial adjustment can be provided up to, for example, 1.00 inch on diameter.

BRIEF DESCRIPTION OF THE DRAWINGS

FIG. 1 is a longitudinal sectional view of a preferred tool, with the working end thereof in partial elevation.
FIG. 2 is a sectional view along line 2—2 of FIG. 1.
FIG. 3 is a sectional view along line 3—3 of FIG. 1.
FIG. 4 is an elevation of the working end of the boring tool showing the coarse adjustment screw.

DESCRIPTION OF PREFERRED EMBODIMENTS

FIGS. 1–4 illustrate a preferred boring tool 10 of the invention. The boring tool includes a tool body 12 having a central longitudinal bore 14 therethrough coaxial with the rotational axis A of the tool body and terminating in a first counterbore 16 at one end and a second counterbore 18 at the other end. A central shaft 20 is disposed in the bore 14 and includes a threaded end 22 extending out of counterbore 16 and a working end 24 extending out of counterbore 18. A nut 26 is shown threaded onto threaded shaft end 22 adjacent a flat washer 28 which confines helical spring 30 in counterbore 16. As will be described more fully below, a tool head 32 is carried slidably on shoulders 24a of working end 24 of the shaft and is pulled axially against the end of the tool body by the nut 26, washer 28 and spring 30 assembly, i.e., by tightening the nut 26 onto threaded shaft end 22.

As shown, a cylindrical portion of the shaft 20 extends through bore 14 and counterbores 16 and 18. An important feature of the shaft 20 is that the outer diameter of the cylindrical portion is smaller than the diameter of bore 14 to provide clearance space and allow the cylindrical portion to float radially in the bore. Another important feature is bushing 33 positioned in close fit in counterbore 18. The shaft 20 is fitted in the axial bore 34 of the bushing. As shown best in FIG. 2, the axial bore 34 is offset (eccentric) relative to the bushing and thus the rotational axis A of tool body 12. The bushing 33 is connected to a circumferential knurled ring 36 by a radial pin 38 which is threaded into the bushing and attached to the knurled ring by flat-head screw 40, FIG. 2. A frusto-conical recess 42 is provided in the tool body 12 to allow rotational movement of the pin 38 when knurled ring 36 is manually rotated for fine adjustment of cutting diameter as will be explained herebelow. When knurled ring 36 is rotated, through angle α (alpha), for example, bushing 33 rotates and turns shaft 20 in an eccentric movement relative to the tool body 12.

As previously mentioned, tool head 32 is carried on the enlarged working end 24 of shaft 20. The tool head includes a radial or transverse slot 46 complementary in shape to shaft end 24 but slightly larger, in dimension to receive shaft end 24 and further having shoulders slidable on shoulders 24a of the shaft end. As best shown in FIG. 4, the tool head also includes a rectangular slot 48 to receive similarly shaped key 50 extending from the working end of the tool body 12. The key 50 and slot 48 function to stop any rotation of the tool head relative to the tool body 12 due to cutting pressure. The key 50 and slot 48 can of course be of the dovetail type. However, if the dovetail type is used, shaft 20 and shaft working end 24 would comprise two components with the working end threaded for example onto the shaft.

For purposes of coarse radial adjustment, the working end 24 of shaft 20 includes a threaded bore 24b extending radially therethrough. A threaded screw 54 is received in the bore 24b and has one end 55 adapted for reaction against the tool head end wall 56 forming the internal end of slot 46 and another end 57 for reaction against nut 60 which has external threads for threadable engagement in threaded bore 52 in the tool head. There is an access hole 64 in nut 60 to accommodate an Allen key in order to rotate adjustment screw 54 within the shaft end 24 which is fixed in position during coarse adjustment by bushing 33. Of course, when screw 54 is rotated the reaction force on either end wall 56 or nut 60 will cause the tool head to move radially in the direction of screw movement. Coarse adjustment is thus effected. Nut 60 also minimizes or prevents backlash in the coarse adjustment mechanism.

Of course, tool head 32 is adapted as by having end slot 70 and pocket 72 to carry a cutting tool or insert 74 as is well known in the art. The cutting tool or insert 74 is held in the pocket 72 by any suitable clamping mechanism (not shown) well known to those in the art. It is apparent that movement of the tool head 32 radially along shoulders 24a of shaft end 24 will provide radial adjustment of the cutting tool position. A wide range of coarse adjustments up to 1.00 inch on diameter can be achieved with the coarse adjustment mechanism described hereinabove while the shaft 20 is held static or stationary relative to the tool body 12 by bushing 33.

In adjusting the boring tool described hereinabove, the coarse adjustment is performed first by rotating adjustment screw 54 with an Allen key. When the screw is rotated, the tool head 32 and cutting tool 74 thereon are moved radially parallel to the axis of the screw as guided by engagement of key 50 in slot 48. Fine adjustment is then performed by rotating knurled ring 36 through a desired angle for adjustment to 0.0001 inch. When ring 36 is rotated the pin 38 causes bushing 33 to rotate and in turn moves shaft 20 through an eccentric path relative to the tool body. As a result, shaft working end 24 and screw 54 tend to follow an eccentric path in slot 46 of tool head 32. However, key 50 restricts movement of the tool head such that eccentric movement of the working end 24 and screw 54 is translated into only a radial movement of tool head 32 parallel to key 50. The tool head is thus microadjusted by rotating bushing 33.

As is apparent in FIG. 1, a key 80 is received in a transverse bore 82 in the tool body and extends into a recess 84 in the shaft 20 to prevent rotation of the latter relative to the tool body when the nut 26 is tightened.

Those skilled in the art will appreciate that the boring tool described hereinabove will be useful for rough boring or finish boring applications with close tolerance being maintainable on bore diameter. By providing different size tool heads, the boring tool could be used to bore diameters of 0.50 inch and above. And, the boring tool is adapted for use with rotary spindles in widespread use today. To this end, the enlarged end 90 of the tool body could be of various outer shapes, for example, cylindrical or conical, to be received in different types of commonly used rotary spindles on existing boring machines. Cutting geometry can also be varied by replacing cutting tool 74 with other tools.

While there have been described what are considered to be certain preferred embodiments of the invention, other modifications, additions, and the like will occur to those skilled in the art and it is intended to cover in the appended claims all such modifications as fall within the true spirit and scope of the invention.

I claim:

1. A boring tool comprising a tool body having a first longitudinal bore, a shaft means disposed in said first bore with clearance such that the shaft means is movable eccentrically in said bore, tool means carried by said shaft means, key means between the tool body and tool means permitting transverse movement of said tool means relative to said tool body, and bushing means rotatable in said first bore and having a second longitudinal bore offset therefrom with the shaft means received in said second bore and movable with said bushing means such that rotation of the bushing means causes the shaft means to move in an eccentric path in said first bore and impart a transverse movement to the tool means relative to the tool body for purposes of tool adjustment.

2. The boring tool of claim 1 wherein the tool means comprises a tool head slidable transversely on a working end of the shaft means to provide coarse adjustment of the transverse position of the tool means.

3. The boring tool of claim 2 wherein screw means is threadably engaged in a threaded transverse bore through the working end of the shaft means and said screw means reacts against the tool head to slide same transversely when the screw means is rotated.

4. The boring tool of claim 1 which further includes a manually-rotatable ring member around the tool body and connected to said bushing means by a transverse pin means extending from said ring member to said bushing means through a transverse opening in said tool body, whereby manual rotation of said ring member causes rotation of said bushing means in said first bore.

5. A boring tool comprising a tool body adapted for rotation about a central axis and having a first longitudinal bore extending therethrough coaxial with said axis, a shaft means disposed in said first bore with radial clearance such that the shaft means is movable eccentrically in said first bore, the shaft means having a working end carrying a tool means outside the tool body, key means between the tool body and tool means permitting radial movement of the tool means relative to the tool body, and bushing means disposed in said first bore coaxial with said axis and rotatable about said axis, the bushing means including a second bore extending therethrough offset from said axis with the shaft means received in said second bore and movable with said bushing means such that rotation of the bushing means causes the shaft means to move in said first bore in an eccentric path relative to said axis and impart a radial movement to said tool means relative to said tool body as guided by said key means.

6. The boring tool of claim 5 which further includes a manually-rotatable ring member circumferentially disposed around the tool body and connected to said bushing means by a radially-extending pin extending from the ring member to the bushing means through an angular radial opening in the tool body.

7. The boring tool of claim 6 wherein the working end of said shaft means comprises an enlarged support head with a pair of spaced, radially-extending support surfaces.

8. The boring tool of claim 7 wherein the tool means comprises a tool head having a radially-extending channel opening toward the support head and receiving same, the channel having a pair of spaced, radially-extending supported surfaces that slidably engage on the support surfaces of said support head.

9. The boring tool of claim 8 wherein the enlarged support head includes a threaded, radially-extending bore parallel with said channel and screw means is threadably received in said threaded bore for reaction against the tool head to slide same radially upon rotation of said screw.

10. The boring tool of claim 9 wherein the tool head includes a radially-extending bore coaxial with said threaded bore, said tool head bore opening to the outside to provide access to the screw means.

11. The boring tool of claim 8 wherein the shaft means includes a threaded end extending outside the tool body on the end opposite the tool head and a nut is threaded onto said threaded end against the bias of a spring disposed between the nut and tool body to pull the tool head against the tool body.

12. The boring tool of claim 11 wherein the shaft means is keyed against rotation in the tool body when the nut is threaded onto said threaded end.

* * * * *